United States Patent
Huang et al.

(10) Patent No.: US 8,363,848 B2
(45) Date of Patent: Jan. 29, 2013

(54) METHOD, COMPUTER READABLE STORAGE MEDIUM AND SYSTEM FOR LOCALIZING ACOUSTIC SOURCE

(75) Inventors: Hsin-Chieh Huang, Minxiong Township, Chiayi County (TW); Wen-Kuo Lin, Taipei (TW); Chih-Wei Kao, Puli Township, Nantou County (TW)

(73) Assignee: TECO Electronic & Machinery Co., Ltd., Taipei (TW)

( * ) Notice: Subject to any disclaimer, the term of this patent is extended or adjusted under 35 U.S.C. 154(b) by 348 days.

(21) Appl. No.: 12/728,578

(22) Filed: Mar. 22, 2010

(65) Prior Publication Data
US 2011/0135102 A1 Jun. 9, 2011

(30) Foreign Application Priority Data
Dec. 4, 2009 (TW) ................................ 98141542 A

(51) Int. Cl.
*H04R 3/00* (2006.01)
(52) U.S. Cl. .......... 381/92; 381/122; 381/56; 348/14.08
(58) Field of Classification Search .............. 381/91–92, 381/122, 56–57; 348/207.11, 14.08–14.09, 348/346, 482, 418–419, 333.02; 367/119
See application file for complete search history.

(56) References Cited

U.S. PATENT DOCUMENTS

| | | | |
|---|---|---|---|
| 5,778,082 A | 7/1998 | Chu et al. | |
| 6,243,471 B1 | 6/2001 | Brandstein et al. | |
| 6,449,593 B1 | 9/2002 | Valve | |
| 6,724,159 B2 * | 4/2004 | Gutta et al. | 315/292 |
| 6,757,397 B1 * | 6/2004 | Buecher et al. | 381/122 |
| 6,826,284 B1 | 11/2004 | Benesty et al. | |
| 7,130,705 B2 * | 10/2006 | Amir et al. | 700/94 |
| 7,313,243 B2 * | 12/2007 | Hsu | 381/92 |
| 8,150,061 B2 * | 4/2012 | Ozawa | 381/92 |
| 2004/0013275 A1 | 1/2004 | Balan et al. | |
| 2010/0128892 A1 * | 5/2010 | Chen et al. | 381/92 |
| 2010/0189271 A1 * | 7/2010 | Tsujino et al. | 381/56 |

* cited by examiner

*Primary Examiner* — Disler Paul
(74) *Attorney, Agent, or Firm* — Patterson & Sheridan, LLP

(57) ABSTRACT

A system for localizing an acoustic source is provided. This system includes a microphone apparatus, an audio processing apparatus, a photographing apparatus, and a decision apparatus. The microphone apparatus receives an acoustic signal and generates at least one received audio signal. The audio processing apparatus generates first location information based on the at least one received audio signal. The decision apparatus generates depth information based on at least one image captured by the photographing apparatus. According to the first location information, the at least one captured image, and the depth information, the decision apparatus determines a location corresponding to the source of the acoustic signal.

16 Claims, 4 Drawing Sheets

METHOD, COMPUTER READABLE STORAGE MEDIUM AND SYSTEM FOR LOCALIZING ACOUSTIC SOURCE

BACKGROUND OF THE INVENTION

1. Field of the Invention

The present invention relates to localization systems. In particular, the present invention relates to systems for localizing an acoustic source based on both image information and audio information.

2. Description of the Prior Art

In most localization systems for localizing acoustic sources, microphone arrays are used to receive acoustic signals and the time delay of arrival (TDOA) algorithm is used for estimating the location of an acoustic source based on the time instants when the microphones receive acoustic signals. However, if there are obstacles blocked between the microphones and the acoustic source, the estimated result generated by this traditional method is usually inaccurate.

U.S. Pat. No. 6,826,284 discloses a localization method that utilizes TDOA and estimates the channel transfer function with the adaptive eigenvalue decomposition algorithm (AEDA) and least-mean square (LMS) algorithm. This method can solve the problem induced by obstacles but is useful only under circumstances with microphones matching with each other and without noises.

As known by those skilled in the art, plural microphones arranged in a single direction can only detect the location of an acoustic source relative to the microphone array in this particular direction. In the localization method disclosed in U.S. Pat. No. 6,243,471, plural microphone groups are used for receiving the acoustic signal generated by an acoustic source. Each of the groups includes at least three microphones. The three-dimensional location of the acoustic source is estimated based on the received signals and the geometric relationships of the microphone groups. Although this method can find out the three-dimensional location of the acoustic source and solve the problem induced by obstacles, a large number of microphones are needed and the system architecture is considerably complicated. Besides, noises may induce errors easily and the microphones are also required to match with each other.

In U.S. Pat. No. 6,449,593, a beamformer for generating beams at specific angles is utilized to suppress noises when the microphones are detecting acoustic signals. This method can be performed under circumstances with noises. However, the problem induced by obstacles cannot be solved and the microphones are required to match with each other, too.

U.S. patent application 2004/00132752 discloses a localization method that estimates the location of an acoustic source with a covariance matrix. The effect of noises can be minimized only when the noises have a Gaussian distribution and an average value equal to zero. Moreover, this method cannot solve the problem induced by obstacles and the microphones are also required to match with each other.

U.S. Pat. No. 5,778,082 discloses a method that eliminates the effect of noises by subtracting the cross-correlation matrix of noises from the cross-correlation matrix of acoustic signals. The disadvantage of this method is that if the cross-correlation matrix of noises is not correctly estimated, the location of the acoustic source cannot be localized correctly, either. Besides, this method cannot solve the problem induced by obstacles and the microphones are also required to match with each other.

As described above, in prior arts, there is not a solution that can solve all the aforementioned problems and estimate the three-dimensional location of an acoustic source.

SUMMARY OF THE INVENTION

To solve the aforementioned problems, this invention provides systems and methods for localizing acoustic sources that are different from prior arts. By utilizing both audio information and image information as the basis for determining the location of an acoustic source, the systems and methods according to the invention need neither complicated hardware structures nor numerous microphones. The three-dimensional location of an acoustic source can be found and the error caused by noises or obstacles can be effectively reduced.

One embodiment according to the invention is an acoustic source localization system including a microphone apparatus, an audio processing apparatus, a photographing apparatus, and a decision apparatus. The microphone apparatus is used for receiving an acoustic signal in a region and generating at least one received audio signal. The audio processing apparatus is used for generating first location information based on the at least one received audio signal. The photographing apparatus is used for photographing the region and generating at least one captured image. The decision apparatus is used for generating depth information of the region based on the at least one captured image. According to the first location information, the at least one captured image, and the depth information, the decision apparatus determines a source location corresponding to the acoustic signal.

Another embodiment according to the invention is an acoustic source localization method. In this method, an acoustic signal in a region is first received and at least one received audio signal is generated. Subsequently, first location information is generated based on the at least one received audio signal. Then, the region is photographed and at least one captured image is generated. Thereafter, depth information of the region is generated based on the at least one captured image. According to the first location information, the at least one captured image, and the depth information, a source location corresponding to the acoustic signal is determined.

Another embodiment according to the invention is a computer readable storage medium having stored therein an acoustic source localization program. In the program, a first instruction is used for generating first location information based on at least one received audio signal. A second instruction is used for generating depth information based on at least one captured image. A third instruction is used for determining a source location corresponding to an acoustic signal based on the first location information, the at least one captured image, and the depth information.

The acoustic source localization system and method according to the invention can be widely utilized in fields such as personal computers, video conferences, interactive robots, sound field reconstruction, etc. The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
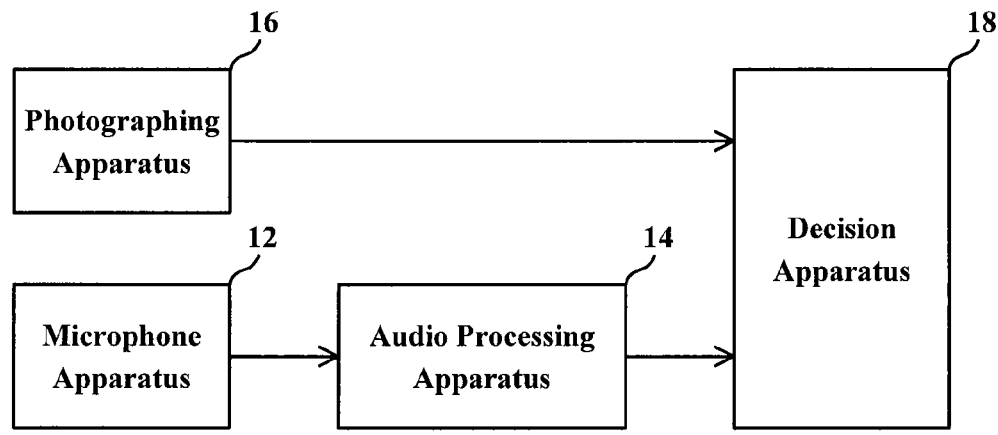
FIG. 1 illustrates the block diagram of the acoustic source localization system in the first embodiment according to the invention.

Please refer to FIG. 1, which illustrates the block diagram of the acoustic source localization system in the first embodiment according to the invention. The acoustic source localization system 10 includes a microphone apparatus 12, an audio processing apparatus 14, a photographing apparatus 16, and a decision apparatus 18.

The microphone apparatus 12 is used for receiving acoustic signals in the region where the acoustic source localization system 10 is located. At least one received audio signal is generated by the microphone apparatus 12. The photographing apparatus 16 is used for photographing the region and generating at least one captured image. Please refer to FIG. 2, which shows an example of integrating the microphone apparatus 12 and the photographing apparatus 16 in a single hardware 20. In this example, the microphone apparatus 12 includes two microphones (12A and 12B), and the photographing apparatus 16 includes two image capturing devices (16A and 16B). Practically, the hardware 20 shown in FIG. 2 can be disposed on the monitor of a personal computer, the wall in a meeting room, or outside the case of an interactive robot.

In actual applications, the microphone apparatus 12 can include more than two microphones, and the photographing apparatus 16 can include one or more image capturing devices. Besides, the image capturing devices 16A and 16B can respectively include a CMOS image sensor or a CCD image sensor.

The audio processing apparatus 14 generates first location information based on the at least one received audio signal outputted by the microphone apparatus 12. Practically, the audio processing apparatus 14 can generate the first location information with, but not limited to, the time delay of arrival (TDOA) algorithm. The microphones 12A and 12B arranged along the X direction shown in FIG. 2 can be taken as an example. If the distances between an acoustic source and the two microphones at the X direction are different, the acoustic signal produced by the acoustic source would arrive at the microphones 12A and 12B at different time instants. Based on the difference between the time instants, the location of the acoustic source at the X direction can be estimated. In other words, the aforementioned first location information can be an absolute position, a relative position, or a coordinate value of the acoustic source at the X direction.

Figure 3:
FIG. 3 is an exemplary depth map.

One of the functions of the decision apparatus 18 is generating depth information of the region based on the at least one image captured by the photographing apparatus 16. In this embodiment, the depth information is the depth map of this region and is generated based on images of the same region captured by two different image capturing devices. FIG. 3 shows an exemplary depth map. In this example, objects closer to the photographing apparatus 16 have lighter color, and objects farther from the photographing apparatus 16 are darker. The distances between the objects and the photographing apparatus 16 are quantifiable and can also be represented by practical values. How to generate a depth map by a photographing apparatus is not a key point in this invention and accordingly not further explained.

Besides the depth information, the decision apparatus 18 is also responsible for determining a source location corresponding to the acoustic signal based on the first location information generated by the audio processing apparatus 14, the at least one captured image captured by the photographing apparatus 16, and the depth information generated by itself.

In this embodiment, the decision apparatus 18 generates second location information by performing image recognition on the image captured by the photographing apparatus 16. Practically, the photographing apparatus 16 can perform image recognition based on human face characteristics. Please refer to FIG. 4, which illustrates an exemplary captured image 40. The ranges 42 and 44 represent the result searched from the image 40 based on human face characteristics. The second location information according to the invention can include information about the ranges labeled by dashed lines, for example, the relative positions, absolute positions, or coordinates of the center points of two ranges.

The decision apparatus 18 can determine a source location corresponding to the acoustic signal based on the first location information, the second location information, and the depth information. Taking the image 40 in FIG. 4 as an example, the decision apparatus 18 can first find out the rough position of the acoustic source at the X direction based on the first location information generated by the audio processing apparatus 14 (i.e. the position labeled as X1 in FIG. 4). Then, based on the second location information, the decision apparatus 18 can search whether there is an image recognition result corresponding to the X1 position. In this example, the range 44 is the image recognition result corresponding to the X1 position.

After finding out the range 44 based on the first location information and the second location information, the decision apparatus 18 can find out the depth information of the range 44 according to the depth map. In other words, the distance between the face in the range 44 and the photographing apparatus 16 can be found out. Subsequently, the three-dimensional location of the acoustic source can be represented by the aforementioned first location information, the second location information, and the depth information.

According to the invention, the decision apparatus 18 can also perform image recognition on the captured image based on the first location information generated by the audio processing apparatus 14. Taking the image 40 in FIG. 4 as an example, the decision apparatus 18 can search only the areas corresponding to the X1 position instead of searching the whole image. The decision apparatus 18 can accordingly reduce both the time of performing image recognition and the hardware/software resources.

Figure 4:
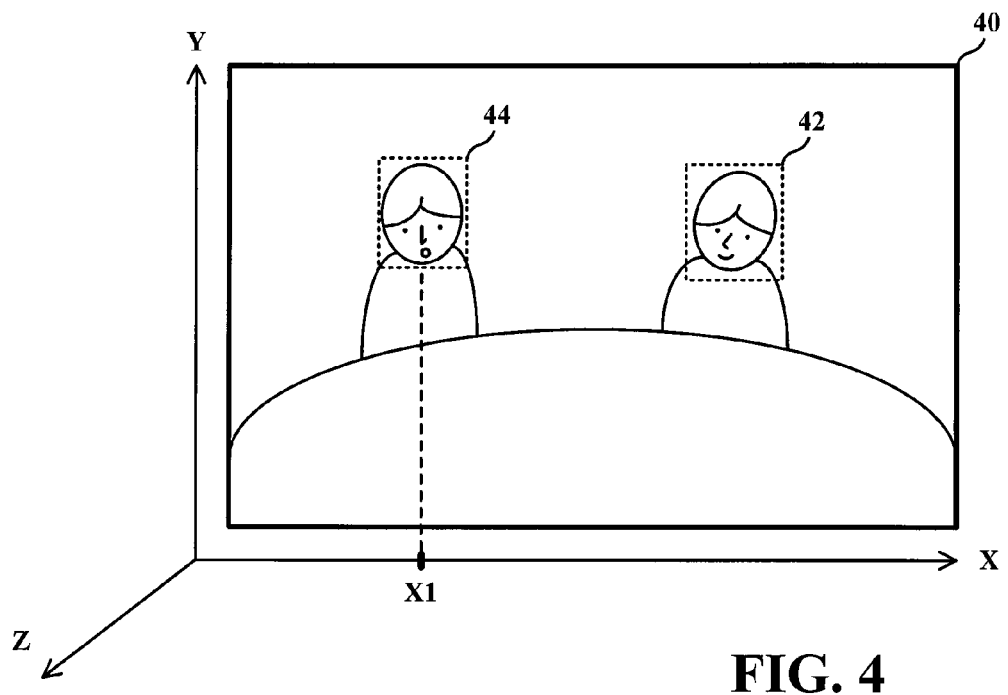
FIG. 4 is an exemplary captured image.

The depth map in FIG. 3 or the captured image in FIG. 4 can both be viewed as having three virtual coordinate axes substantially perpendicular to each other. According to the invention, the first location information can include a horizontal coordinate on the horizontal axis X. The second location information can include a vertical coordinate on the vertical axis Y. The depth information can include a depth coordinate on the depth axis Z corresponding to both the horizontal coordinate and the vertical coordinate. Practically, the decision apparatus 18 can represent the source location of the acoustic source by the coordinates or a range at the three directions.

The axis corresponding to the first location information is relative to the position of the microphone apparatus 12. More specifically, if the microphones 12A and 12B are disposed along the Y direction in FIG. 4, the first location information can become the vertical coordinate on the vertical axis Y. In actual applications, the microphone apparatus 12 can simultaneously include microphones disposed along the X direction and the Y direction.

Further, the audio processing apparatus 14 and the decision apparatus 18 can be integrated in a single chip. As described above, besides audio information, the acoustic source localization system 10 according to the invention also utilizes image information as the basis for determining the location of an acoustic source. Therefore, even if there are obstacles blocked between the microphone apparatus 12 and the acoustic source, as long as the obstacles are not extremely huge, the decision apparatus 18 can still find out the source location according to the information gathered by the microphone apparatus 12 and the photographing apparatus 16. Moreover, the decision apparatus 18 according to the invention can find out the depth information of the acoustic source and determines the three-dimensional position of the acoustic source. It can be seen the architecture of the acoustic source localization system 10 according to the invention is considerably simple; numerous microphones and complicated three-dimensional calculation are not required.

In actual applications, the decision apparatus 18 can perform image recognition on the captured image based on characteristics other than human face characteristics. Please refer to FIG. 5, which illustrates the block diagram of the acoustic source localization system in the second embodiment according to the invention. In this embodiment, the acoustic source localization system further includes a database 50 therein storing plural default acoustic source images. These default acoustic source images are used as the basis for image recognition. For instance, the default acoustic source images can include images of human faces, animal faces, and other devices can produce sound (such as a speaker). In other words, when performing image recognition, the decision apparatus 18 can search the captured image based on the default acoustic source images stored in the database 50.

Figure 5:
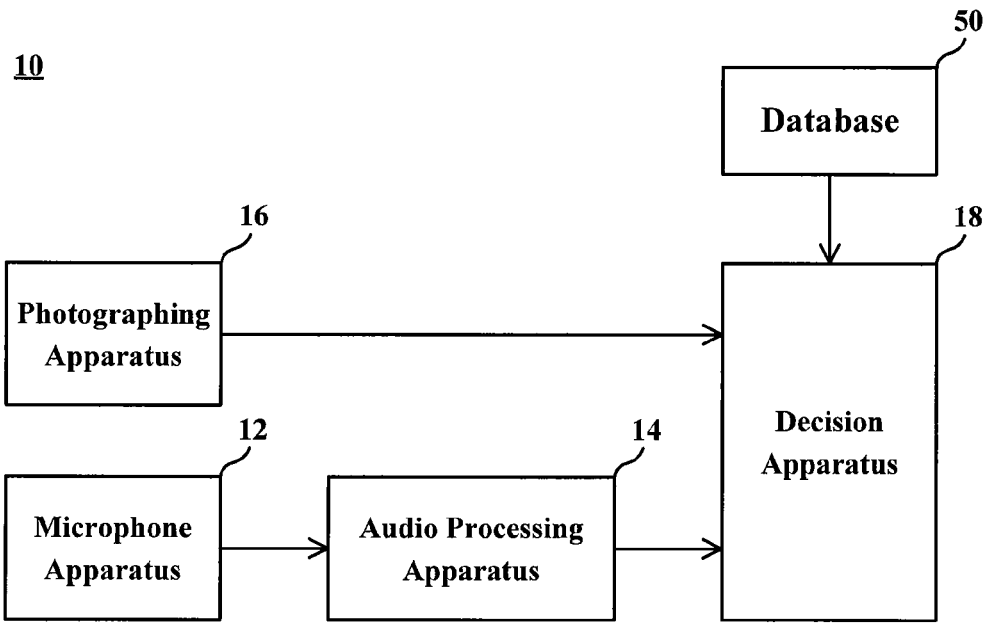
FIG. 5 illustrates the block diagram of the acoustic source localization system in the second embodiment according to the invention.

The block diagram of the acoustic source localization system in the third embodiment according to the invention is the same as the one shown in FIG. 5. The main difference between this acoustic source localization system and the previous acoustic source localization system is that the acoustic source localization system in the third embodiment is used in conditions where all the possible acoustic sources are known. For example, the acoustic source localization system can be used in a meeting room of a company. The facial images of people who might present in the meetings are previously stored in the database 50.

The decision apparatus 18 in the third embodiment can perform image recognition on the image captured by the photographing apparatus 16 based on the first location information generated by the audio processing apparatus 14. Whether there is any target corresponding to one of the default acoustic source images in the range corresponding to the first location information is determined. For instance, if the facial image of Peter is previously stored in the database 50 and also found in the captured image based on the first location information, the decision apparatus 18 can take the facial image of Peter as a target image and generate second location information corresponding to this range.

On the other side, the decision apparatus 18 is also responsible for generating depth information based on the target image and its corresponding default source image. According to the invention, when the possible acoustic sources are taken photos for generating the default source images, the distance between the acoustic sources and the photographing apparatus is known. This distance can also be stored in the database 50. Therefore, the decision apparatus 18 can determine the depth information based on the size ratio of the target image and its corresponding default source image.

Practically, each of the default acoustic source images can respectively be a three-dimensional image. According to the three-dimensional information, even if the acoustic source does not directly face to the photographing apparatus 16, the decision apparatus 18 can still estimate the depth information of the target image. It should be noted that in this embodiment, the photographing apparatus 16 can include only one image capturing device and the image captured by the image capturing device can provide enough basis for determining the depth information.

Figure 6:
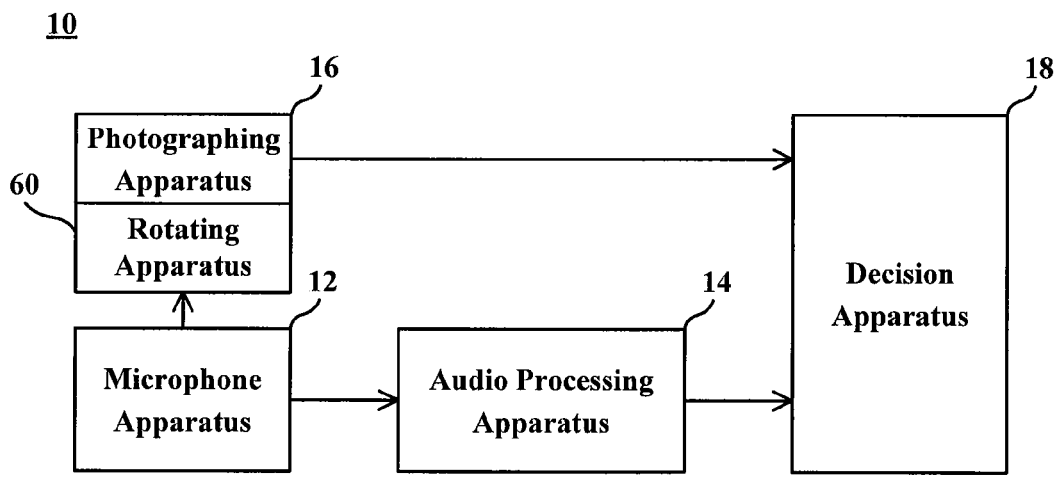
FIG. 6 illustrates the block diagram of the acoustic source localization system in the fourth embodiment according to the invention.

Please refer to FIG. 6, which illustrates the block diagram of the acoustic source localization system in the fourth embodiment according to the invention. In this embodiment, the acoustic source localization system 10 further includes a rotating apparatus 60 for adjusting the photographing angle of the photographing apparatus 16 according to the first location information. Generally, the receiving angle of a microphone is wider than the capturing angle of a single camera lens. If the first location information generated by the audio processing apparatus 14 reveals the location of the acoustic source is far away from the center of the region, for instance, close to the left/right edge of the captured image, the rotating apparatus 60 can be operated to rotate the photographing apparatus 16 toward the location of the acoustic source.

Figure 7:
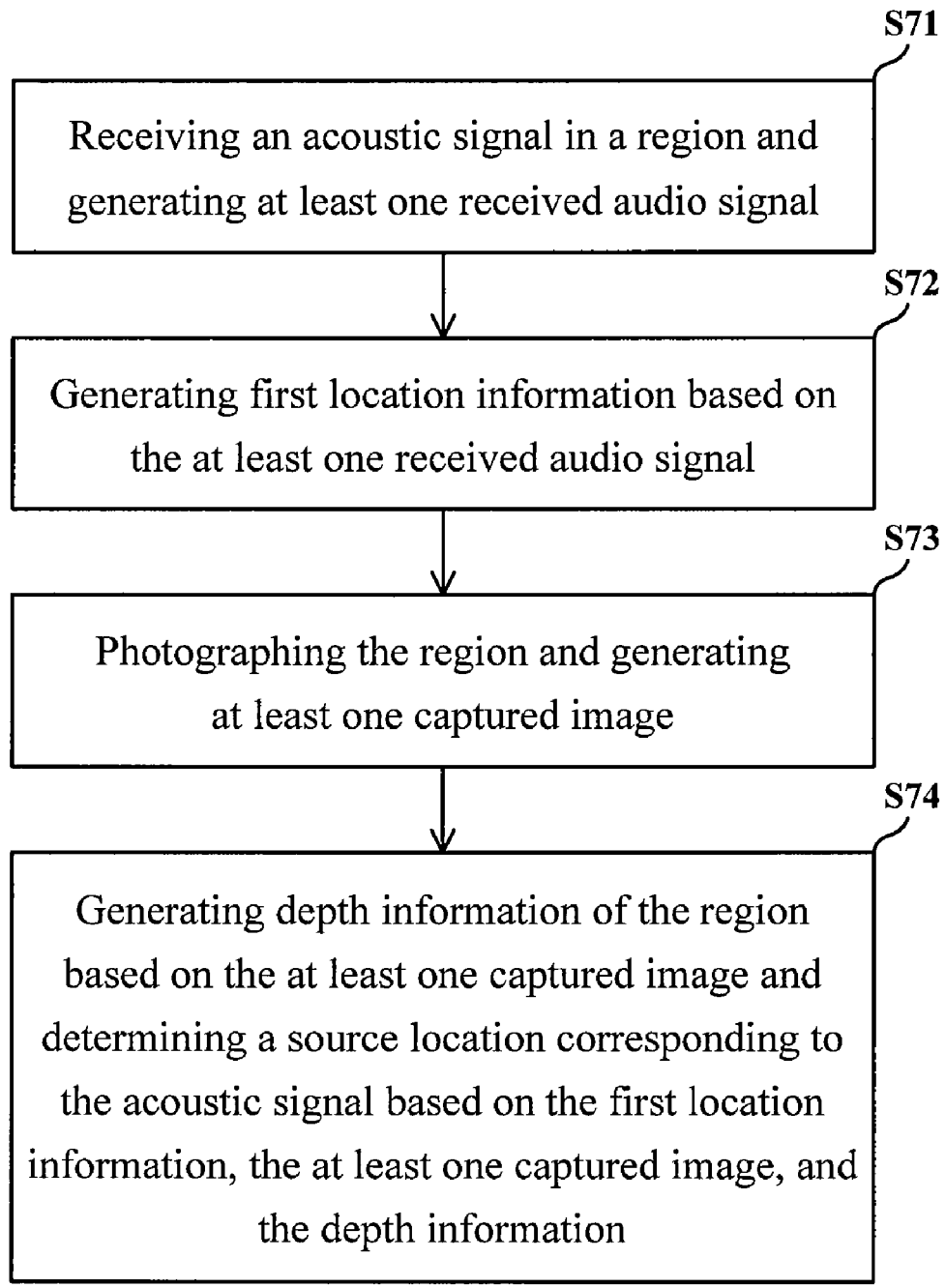
FIG. 7 illustrates the flowchart of the acoustic source localization method in the fifth embodiment according to the invention.

Please refer to FIG. 7, which illustrates the flowchart of the acoustic source localization method in the fifth embodiment according to the invention. In this method, step S71 is first performed to receive an acoustic signal in a region and generating at least one received audio signal. Then, step S72 is generating first location information based on the at least one received audio signal. Step S73 is photographing the region and generating at least one captured image. Step S74 is generating depth information of the region based on the at least one captured image and determining a source location corresponding to the acoustic signal based on the first location information, the at least one captured image, and the depth information.

In actual applications, steps S71~S72 and step S73 can be performed at the same time. In other words, step S73 can be started before step S72 is done. Practically, the time delay of arrival algorithm can be utilized for generating the first localization information in step S72. How the acoustic source is localized in step S74 is almost the same as those in the aforementioned embodiments and accordingly is not further described.

The sixth embodiment according to the invention is a computer readable storage medium and a program for localizing acoustic sources is stored therein. The first instruction in the program is used for generating first location information based on at least one received audio signal. The second instruction is used for generating depth information based on at least one captured image. The third instruction is used for determining a source location corresponding to an acoustic signal based on the first location information, the at least one captured image, and the depth information.

Figure 2:
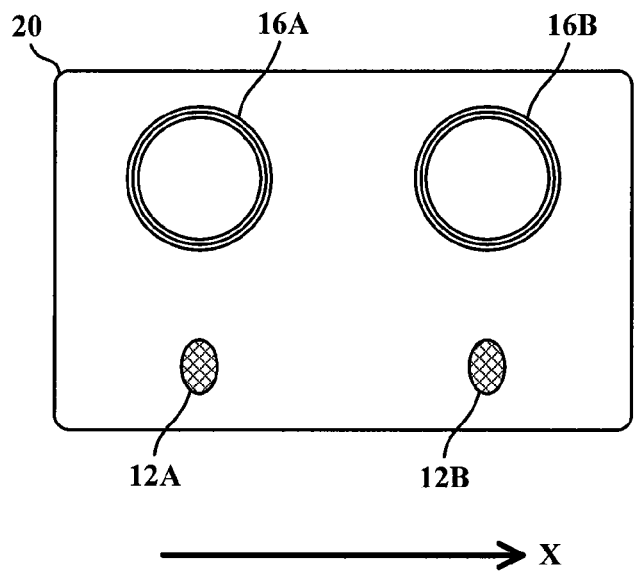
FIG. 2 shows an example of integrating the microphone apparatus and the photographing apparatus according to the invention in a single hardware.

This program can cooperate with the hardware 20 including the microphone apparatus 12 and the photographing apparatus 16 as shown in FIG. 2. In actual applications, the computer readable storage medium can be a memory located in an electronic system, a storage device located outside an electronic system, or an optical disk with the program burned therein. How the location of an acoustic source is determined in this embodiment is similar to that in the aforementioned embodiments and therefore not further described.

The acoustic source localization systems, methods, and computer-readable storage media according to the invention can be widely utilized in fields such as personal computers, video conferences, interactive robots, sound field reconstruction, etc. By utilizing both audio information and image information as the basis for determining the location of an acoustic source, the systems and methods according to the invention need neither complicated hardware structures nor numerous microphones. The three-dimensional location of an acoustic source can be found and the error caused by noises or obstacles can be effectively prevented.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An acoustic source localization system, comprising:
   a microphone apparatus operable to receive an acoustic signal in a region and generate at least one received audio signal;
   an audio processor operable to generate first location information based on the at least one received audio signal generated from the microphone apparatus;
   a photographing apparatus operable to photograph the region and generate at least one captured image; and
   a decision controller operable to generate depth information of the region based on the at least one captured image generated from the photographing apparatus and determine a source location corresponding to the acoustic signal based on the first location information, the at least one captured image, and the depth information.

2. The acoustic source localization system of claim 1, wherein the microphone apparatus comprises plural microphones, each of the microphones respectively receives the acoustic signal and respectively generates one of the received audio signals; the audio processor generates the first location information based on at least one difference between the received audio signals.

3. The acoustic source localization system of claim 1, wherein the decision controller performs image recognition on the at least one captured image to generate second location information; according to the first location information, the second location information, and the depth information, the decision controller determines the source location corresponding to the acoustic signal.

4. The acoustic source localization system of claim 3, wherein the decision controller performs image recognition on the at least one captured image based on the first location information.

5. The acoustic source localization system of claim 3, wherein the photographing apparatus comprises two image capturers and the depth information is a depth map.

6. The acoustic source localization system of claim 5, wherein the depth map has a horizontal axis, a vertical axis, and a depth axis, the axes are substantially perpendicular to each other; the first location information comprises a horizontal coordinate on the horizontal axis, the second location information comprises a vertical coordinate on the vertical axis; after determining a depth coordinate on the depth axis corresponding to the horizontal coordinate and the vertical coordinate, the decision controller labels the source location by the horizontal coordinate, the vertical coordinate, and the depth coordinate.

7. The acoustic source localization system of claim 3, further comprising:
   a database therein storing plural default acoustic source images, the decision controller performs image recognition on the at least one captured image based on the default acoustic source images.

8. The acoustic source localization system of claim 7, wherein if the decision controller finds out, from the at least one captured image, a target image corresponding to one of the default acoustic source images, the decision controller generates the depth information according to the target image and the corresponding default acoustic source image.

9. The acoustic source localization system of claim 8, wherein each of the default acoustic source images is respectively a three-dimensional image.

10. An acoustic source localization method, comprising the steps:
    (a) receiving an acoustic signal in a region and generating at least one received audio signal;
    (b) generating first location information based on the at least one received audio signal;
    (c) photographing the region and generating at least one captured image; and
    (d) generating depth information of the region based on the at least one captured image and determining a source location corresponding to the acoustic signal based on the first location information, the at least one captured image, and the depth information.

11. The acoustic source localization method of claim 10, wherein in step (d), second location information is generated by performing image recognition on the at least one captured image; the source location corresponding to the acoustic signal is determined according to the first location information, the second location information, and the depth information.

12. The acoustic source localization method of claim 11, wherein in step (d), image recognition is performed on the at least one captured image based on the first location information.

13. The acoustic source localization method of claim 11, wherein the depth information is a depth map.

14. The acoustic source localization method of claim 13, wherein the depth map has a horizontal axis, a vertical axis, and a depth axis, the axes are substantially perpendicular to each other; the first location information comprises a horizontal coordinate on the horizontal axis, the second location information comprises a vertical coordinate on the vertical axis; in step (d), after a depth coordinate on the depth axis corresponding to the horizontal coordinate and the vertical coordinate is determined, the source location is represented by the horizontal coordinate, the vertical coordinate, and the depth coordinate.

15. The acoustic source localization method of claim 11, wherein in step (d), image recognition is performed on the at least one captured image based on plural default acoustic source images.

16. The acoustic source localization method of claim 15, wherein step (d) comprises:
    from the at least one captured image, finding out a target image corresponding to one of the default acoustic source images; and generating the depth information according to the target image and the corresponding default acoustic source image.

* * * * *